US011251487B2

(12) United States Patent
Wang et al.

(10) Patent No.: US 11,251,487 B2
(45) Date of Patent: Feb. 15, 2022

(54) BATTERY MODULE AND BATTERY PACK

(71) Applicant: CONTEMPORARY AMPEREX TECHNOLOGY CO., LIMITED, Ningde (CN)

(72) Inventors: Peng Wang, Ningde (CN); Haizu Jin, Ningde (CN); Linggang Zhou, Ningde (CN); Dongyang Shi, Ningde (CN); Xingdi Chen, Ningde (CN); Kaijie You, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 241 days.

(21) Appl. No.: 16/441,895

(22) Filed: Jun. 14, 2019

(65) Prior Publication Data
US 2020/0287179 A1 Sep. 10, 2020

(30) Foreign Application Priority Data

Mar. 7, 2019 (CN) .......................... 201910172995.2

(51) Int. Cl.
*H01M 2/10* (2006.01)
*H01M 2/12* (2006.01)
(Continued)

(52) U.S. Cl.
CPC ....... *H01M 50/20* (2021.01); *H01M 10/0431* (2013.01); *H01M 50/30* (2021.01)

(58) Field of Classification Search
None
See application file for complete search history.

(56) References Cited

U.S. PATENT DOCUMENTS

2008/0220320 A1* 9/2008 Horikoshi ........... H01M 50/579
429/82
2010/0000816 A1* 1/2010 Okada ................. H01M 10/625
180/68.5
(Continued)

FOREIGN PATENT DOCUMENTS

CN 101192683 A 6/2008
CN 102347509 A 2/2012
(Continued)

OTHER PUBLICATIONS

International Search Report (and English translation) and Written Opinion of the International Searching Authority for International Application No. PCT/CN2020/077803 dated Jun. 5, 2020,
(Continued)

*Primary Examiner* — Lisa S Park
(74) *Attorney, Agent, or Firm* — Heslin Rothenberg Farley & Mesiti P.C.

(57) ABSTRACT

Disclosed is a battery module including a battery cell array structure, an upper cap and a lower cap, the battery cell array structure is disposed between the upper cap and the lower cap. Each battery cell includes an electrode assembly and a battery case. The electrode assembly is of a wound structure and flat, outer surface of the electrode assembly includes two flat surfaces facing each other in a vertical direction; or the electrode assembly is of a laminated structure, the first electrode plate, the separator and the second electrode plate are laminated in the vertical direction. Being distinguished from the existing technology, the maximum swelling force of the battery module may be reduced, thus end plates with smaller volumes may be selected to improve energy density of the battery module.

13 Claims, 10 Drawing Sheets

(51) Int. Cl.
*H01M 10/04* (2006.01)
*H01M 50/20* (2021.01)
*H01M 50/30* (2021.01)

(56) References Cited

U.S. PATENT DOCUMENTS

| | | | |
|---|---|---|---|
| 2012/0028099 A1* | 2/2012 | Aoki | H01M 10/6557 |
| | | | 429/120 |
| 2013/0252037 A1* | 9/2013 | Chiba | F16K 17/16 |
| | | | 429/53 |
| 2014/0227570 A1 | 8/2014 | Hoshi et al. | |

FOREIGN PATENT DOCUMENTS

| | | | |
|---|---|---|---|
| CN | 108140779 A | | 6/2018 |
| CN | 209447877 U | | 9/2019 |
| CN | 209447949 U | | 9/2019 |
| CN | 209981295 U | | 1/2020 |
| EP | 2357688 A1 | | 8/2011 |
| EP | 2958166 A1 | | 12/2015 |
| EP | 2958185 A1 | | 12/2015 |
| JP | 2010287550 A | | 12/2010 |
| JP | 2017-182898 | * | 10/2017 |
| KR | 20180125795 A | | 11/2018 |

OTHER PUBLICATIONS

Extended European Search Report for European Application No. 19179690.3 dated Jan. 3, 2020.

* cited by examiner

BATTERY MODULE AND BATTERY PACK

CROSS-REFERENCE TO RELATED APPLICATION

This application claims the priority benefit of Chinese Patent Application Serial No. 201910172995.2 filed on Mar. 7, 2019 and entitled "BATTERY MODULE AND BATTERY PACK", the disclosure of which is incorporated by reference herein in its entirety.

TECHNICAL FIELD

The present disclosure relates to the field of battery technology, particularly a battery module and a battery pack.

BACKGROUND

A secondary battery is advantageous in its high energy density, long service life, energy saving, environmental protection and the like, and is widely used in various fields such as new-energy vehicles and energy storage power stations.

SUMMARY

Some embodiments provide a battery module, including:
a battery cell array structure, including a plurality of battery cells and a plurality of bus bars electrically connecting the plurality of battery cells respectively, the plurality of battery cells being arranged in a horizontal direction;
an upper cap; and
a lower cap, the battery cell array structure being disposed between the upper cap and the lower cap;
wherein a battery cell includes an electrode assembly and a battery case, the electrode assembly is housed in the battery case, and the electrode assembly includes a first electrode plate, a second electrode plate, and a separator disposed between the first electrode plate and the second electrode plate; and
wherein the electrode assembly is of a wound structure and is flat, outer surface of the electrode assembly includes two flat surfaces facing each other in a vertical direction; or the electrode assembly is of a laminated structure, the first electrode plate, the separator and the second electrode plate are laminated in the vertical direction.

In some embodiments, the upper cap includes a first main board and a first fixing portion connecting to the first main board and extending away from the first main board;
the lower cap includes a second main board and a second fixing portion connecting to the second main board and extending away from the second main board;
the first fixing portion is disposed opposite and fixedly connected to the second fixing portion.

In some embodiments, the first fixing portion and/or the second fixing portion extend(s) in the horizontal direction.

In some embodiments, both ends of the first main board are disposed with the first fixing portion, and both ends of the second main board are disposed with the second fixing portion.

In some embodiments, the battery module further includes an acquisition board located at one side of the battery cell array structure and vertically disposed, the acquisition board connects to the battery cells in the battery cell array structure.

In some embodiments, the battery module further includes a fireproof member disposed vertically, the plurality of battery cells of the battery cell array structure are each disposed with a vent, and all vents of the battery cell array structure face the fireproof member.

In some embodiments, the battery module includes two or more battery cell array structures, one of which is a first battery cell array structure, and the other/another battery cell array structure adjacent to the first battery cell array structure is a second battery cell array structure; and
vents of the first battery cell array structure face vents of the second battery cell array structure and vice versa, a fireproof member is located between the vents of the first battery cell array structure and the vents of the second battery cell array structure.

In some embodiments, the battery module includes two or more battery cell array structures, one of which is a first battery cell array structure, and the other/another battery cell array structure adjacent to the first battery cell array structure is a second battery cell array structure;
the vents of the first battery cell array structure face away from the vents of the second battery cell array structure; and
the fireproof member includes a first fireproof member and a second fireproof member, the vents of the first battery cell array structure face the first fireproof member, and the vents of the second battery cell array structure face the second fireproof member.

In some embodiments, the battery module includes two or more battery cell array structures, one of which is a first battery cell array structure, and the other/another battery cell array structure adjacent to the first battery cell array structure is a second battery cell array structure; and
the battery module further includes a cooling member disposed between the first battery cell array structure and the second battery cell array structure, the cooling member is configured to cool the battery cells of the first battery cell array structure and the battery cells of the second battery cell array structure.

In some embodiments, the battery module includes two or more said battery cell array structures arranged in the vertical direction.

Being distinguished from the existing technology, the electrode assembly may swell in the thickness direction of the electrode plate during charging and discharging (in the electrode assembly of the wound structure, a swelling force is greatest in a direction perpendicular to the flat surfaces; in the electrode assembly of the laminated structure, the swelling force is greatest in a laminating direction of the first electrode plate and the second electrode plate). In the existing technology, however, for a battery cell of the battery module, the greatest swelling force of the electrode assembly on the case is always in the horizontal direction. Since the dimension of the battery module in the horizontal direction is much larger than the dimension in the vertical direction (for example, limited by a height of a car's chassis, more battery cells are needed to be arranged in the horizontal direction, and the swelling force is accumulated), the existing battery module bears an extremely great swelling force in the horizontal direction. Therefore, it is necessary to arrange two particularly thick end plates on both sides of the battery module in the horizontal direction so as to resist the swelling force. However, an increased thickness to the end plates may decrease energy density of the battery module. In the above-described solution, the electrode assembly may be of the wound structure or the laminated structure. When the electrode assembly is of the wound structure, the flat surfaces face the vertical direction. When the electrode assembly is of the laminated structure, the first electrode plate and the second electrode plate are laminated in the vertical direction. Accordingly, no matter whether the electrode assembly is of the wound or the laminated structure, the greatest swelling force of the electrode assembly on the case is always in the vertical direction, but there are less battery cells stacked in the vertical direction. Therefore, compared with the existing technology, the above-described solution may reduce the maximum swelling force of the battery module. Therefore, end plates with smaller volumes may be selected to improve energy density of the battery module.

Some embodiments further provides a battery pack including:

a housing, and a plurality of battery modules according to any one of those provided by the inventors, being disposed in the housing.

In some embodiments, the upper cap includes the first main board and the first fixing portion connecting to the first main board and extending away from the first main board; the lower cap includes the second main board and the second fixing portion connecting to the second main board and extending away from the second main board; and the housing includes a housing cap and a housing body; the housing body is disposed with a fixing rod protruding from a surface of the housing body, and the first fixing portion, the second fixing portion and the fixing rod are disposed oppositely, the first fixing portion and the second fixing portion are fixed to the fixing rod.

In some embodiments, the first fixing portion is disposed with a first fixing bore, the second fixing portion is disposed with a second fixing bore, and the battery pack further includes a bolt which passes through the first fixing bore and the second fixing bore and connects to the fixing rod to fix the battery module to the housing body.

In some embodiments, the battery pack further includes a bead, wherein the first fixing portion and the second fixing portion are pressed between the bead and the fixing rod, so that the battery module is fixed to the housing body.

Being distinguished from the existing technology, in the above-described technical solution, the electrode assembly of the battery cell in the battery module may be of the wound structure or the laminated structure. When the electrode assembly is of the wound structure, the flat surfaces face the vertical direction. When the electrode assembly is of the laminated structure, the first electrode plate and the second electrode plate are laminated in the vertical direction. Accordingly, no matter whether the electrode assembly is of the wound or the laminated structure, the greatest swelling force of the electrode assembly on the case is always in the vertical direction, but there are less battery cells stacked in the vertical direction. Therefore, compared with the existing technology, the above-described solution may reduce the maximum swelling force of the battery module. Therefore, end plates with smaller volumes may be selected to improve energy density of the battery module.

Figure 1:
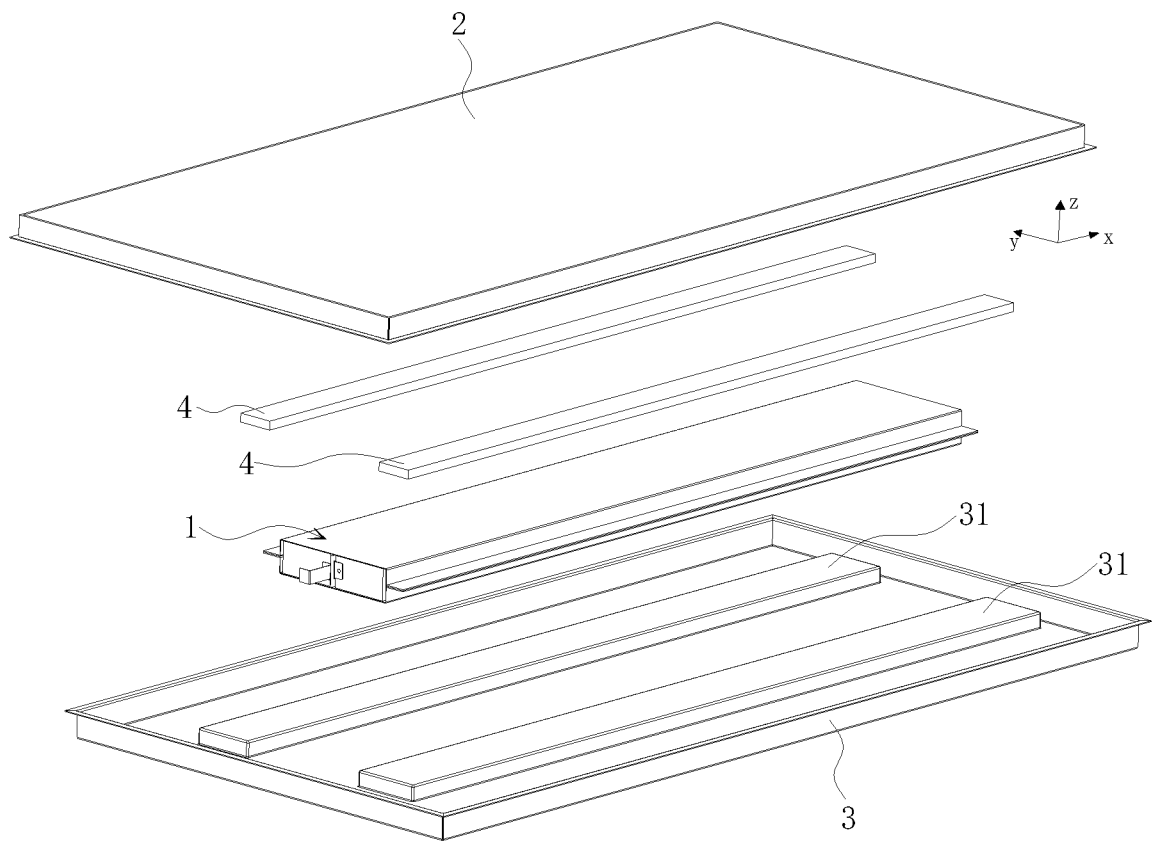
FIG. 1 shows an exploded view of a battery pack.

LIST OF REFERENCE SIGNS 1. battery module
   10. battery cell array structure
      101. first battery cell array structure
      102. second battery cell array structure
   11. battery cell
      111. electrode assembly
         1111. first electrode plate
         1112. second electrode plate
         1113. separator
         1114. flat surface
      112. battery case
         1121. first surface
         1122. second surface
      113. electrode terminal connector
      114. cap plate
      115. electrode terminal
      116. vent
   12. bus bar
   13. upper cap
      130. first main board
      131. first fixing portion
         1311. first fixing bore
   14. lower cap
      140. second main board
      141. second fixing portion
         1411. second fixing bore
   15. acquisition board
   16. end plate
   17. fireproof member
      171. first fireproof member
      172. second fireproof member
   18. cooling member
2. housing cap
3. housing body
   31. fixing rod
4. bead
5. bolt

DETAILED DESCRIPTION

Technical contents, structural features, objectives and effects of the present disclosure will be described in detail below with reference to the specific embodiments and the accompanying drawings.

In the description of the present disclosure, the terms "first" and "second" are used for descriptive purposes only, and are not to be construed as indicating or implying relative importance, unless otherwise specified and defined. The term "plurality" refers to two or more, unless otherwise specified and defined. The terms "connect" and "fix", etc. should be perceived in a broad sense, for example, "connection" may either be a fixed connection, or a detachable connection, or an integrated connection, or an electrical connection; it may be a directly connection, or an indirect connection through an intermediate medium. For the skilled person in the art, the specific meanings of the above terms in the present disclosure may be perceived on a case-by-case basis.

In the description of the present disclosure, a direction indicated by an arrow x in all the drawings is a length direction, a direction indicated by an arrow y in all the drawings is a width direction, and a direction indicated by an arrow z in all the drawings is a vertical direction. A horizontal direction is a direction parallel to the horizontal plane, and may either be the above-described length direction or be the above-described width direction. In addition, the horizontal direction includes not only a direction that is parallel to the horizontal plane, but also a direction generally parallel to the horizontal plane as is conventionally recognized in engineering. The vertical direction is a direction perpendicular to the horizontal plane, and the vertical direction includes not only the direction perpendicular to the horizontal plane, but also the direction generally perpendicular to the horizontal plane as is conventionally recognized in engineering. In addition, description on such terms as "upper", "lower", "top", "bottom" and the like are perceived relative to the vertical direction.

When the secondary battery in the existing technology is in use, a plurality of battery cells are usually sequenced and electrically connected to each other by a bus bar. In order to fix the plurality of battery cells, end plates and side plates are usually provided and mutually connected to form a module frame in which the plurality of battery cells are fixed.

The battery cell may swell and deform during use, which is particularly noticeable in the direction of the longest dimension of the battery module. In an existing battery module, the maximum swelling force of the battery cell is in a length direction which is the direction of the longest dimension of the battery module. Therefore, the amount of swelling deformation of the battery module in the length direction is very large. In order to prevent excessive swelling deformation of the battery module in the length direction, the end plates of the battery module need to be thickened to cause large volume of the end plates, resulting in low energy density of the battery module to be low, and being disadvantageous for lightening the battery module.

Figure 2:
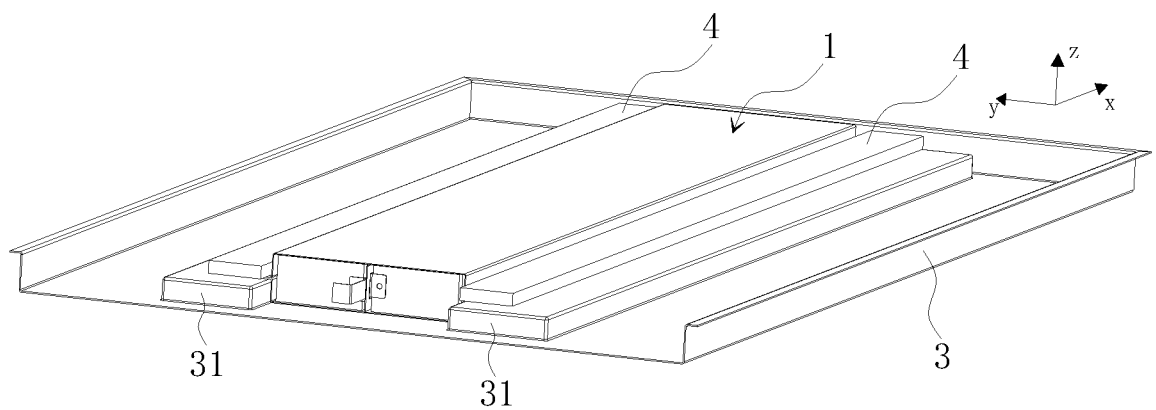
FIG. 2 shows a schematic structure of the battery pack.

In view of this, with reference to FIG. 1 and FIG. 2, this embodiment relates to a battery pack including a housing and a plurality of battery modules 1 disposed in the housing. The plurality of battery modules 1 may be arranged in the horizontal direction (the length direction indicated by the arrow x or the width direction indicated by the arrow y) or in the vertical direction (the direction indicated by the arrow z).

Figure 3:
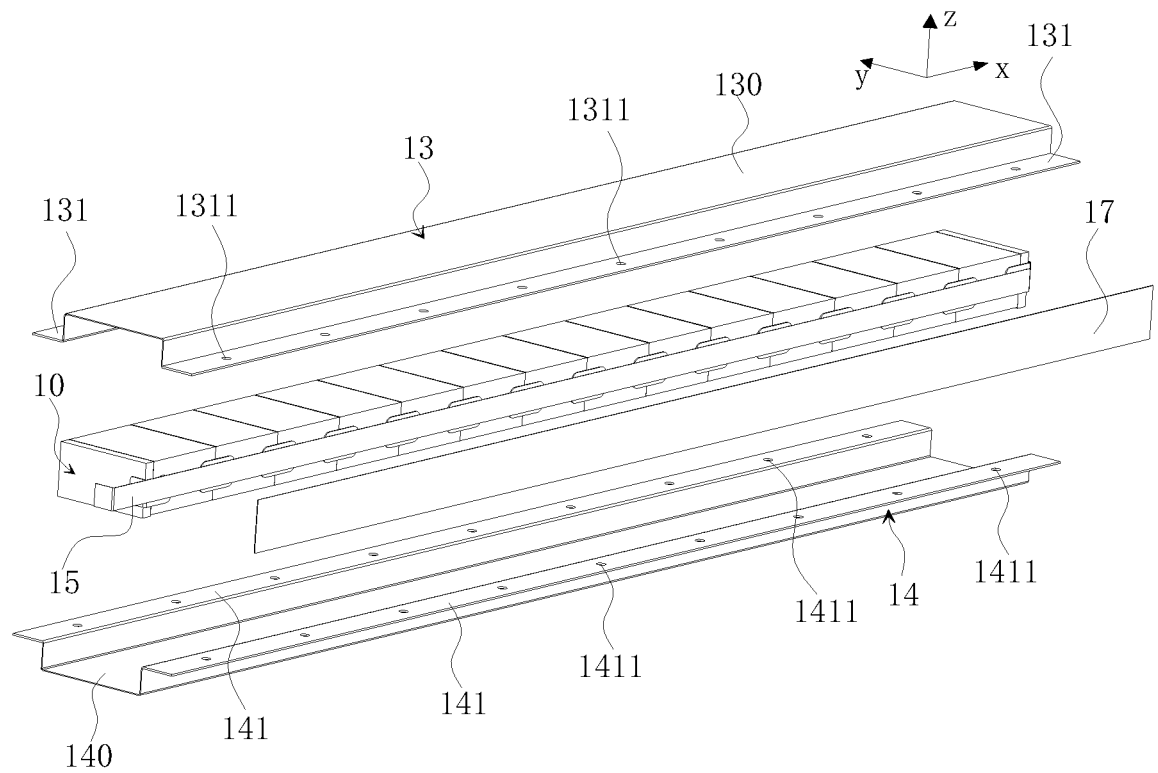
FIG. 3 shows an exploded view of a battery module with a single battery cell array structure.

Herein, as shown in FIG. 3, the battery module 1 includes an upper cap 13 and a lower cap 14. The upper cap 13 includes a first main board 130 and a first fixing portion 131 connecting to the first main board 130 and extending away from the first main board 130. The lower cap 14 includes a second main board 140 and a second fixing portion 141 connecting to the second main board 140 and extending away from the second main board 140. The first fixing portion 131 is disposed opposite and fixedly connected to the second fixing portion 141.

Alternatively, the first main board 130 and the first fixing portion 131 are integrally formed, the second main board 140 and the second fixing portion 141 are integrally formed, and the first fixing portion 131 and the second fixing portion 141 are mutually fixed in one of adhesive, welding and mechanical manners.

Alternatively, the housing includes a housing cap 2 and a housing body 3, and the housing body 3 is disposed with a plurality of fixing rods 31. Further, in another embodiment, the fixing rods 31 may be disposed on the housing cap 2. In this embodiment, the fixing rod 31 may be a protrusion from a bottom of the housing body 3 or a single part welded to the bottom of the housing body 3. Herein, the first fixing portion 131, the second fixing portion 141 and the fixing rod 31 are disposed oppositely. The first fixing portion 131 is disposed over the second fixing portion 141, and the second fixing portion 141 is disposed over the fixing rod 31. Both the first fixing portion 131 and the second fixing portion 141 are fixed to the fixing rod 31. In this way, the battery module 1 is fixed to the fixing rod 31 through the first fixing portion 131 and the second fixing portion 141, which guarantees stability of the battery pack during use.

Alternatively, the first fixing portion 131 and the second fixing portion 141 are fixed to the fixing rod 31 in, but not limited to, the following two manners.

In one fixing manner, the first fixing portion 131 is disposed with first fixing bores 1311, and the second fixing portion 141 is disposed with second fixing bores 1411. The battery pack further includes bolts 5, and a bolt 5 passes through a first fixing bore 1311 and a second fixing bore 1411 and connects with the fixing rod 31, so that the battery module 1 is fixed to the housing body 3. The second fixing bores 1411 are disposed facing the first fixing bores 1311 respectively, and the fixing rod 31 is disposed with nuts matching the bolts.

In the other fixing manner, the battery pack further includes a bead 4 which presses the first fixing portion 131 and the second fixing portion 141 on the fixing rod 31, so that the battery module 1 is fixed to the housing body 3. In this way, the bead 4 is used to fix the battery module 1.

Alternatively, the first fixing portion 131 and/or the second fixing portion 141 extend(s) in the horizontal direction (the length direction indicated by the arrow x or the width direction indicated by the arrow y). In some embodiments, the first fixing portion 131 and the second fixing portion 141 extend in the vertical direction (the direction indicated by the arrow z). In this embodiment, the first fixing portion 131 and the second fixing portion 141 extend in the horizontal direction (the length direction indicated by the arrow x or the width direction indicated by the arrow y), so that assembling difficulty may be reduced.

Alternatively, both ends of the first main board 130 are disposed with the first fixing portion 131, and both ends of the second main board 140 are disposed with the second fixing portion 141. In this way, mounting points of the battery module 1 are distributed on both ends in the horizontal direction (the length direction indicated by the arrow x or the width direction indicated by the arrow y), so that the battery module 1 installed in the battery pack is more evenly loaded.

Herein, both ends of the first main board 130 may be disposed with the first fixing portion 131 in the width direction (e.g., the direction indicated by the arrow y) marked in the drawings, or both ends of the first main board 130 may be disposed with the first fixing portion 131 in the length direction (e.g., the direction indicated by the arrow x) marked in the drawings. Similarly, both ends of the second main board 140 may be disposed with the second fixing portion 141 in the width direction (e.g., the direction indicated by the arrow y) marked in the drawings, or both ends of the second main board 140 may be disposed with the second fixing portion 141 in the length direction (e.g., the direction indicated by the arrow x) marked in the drawings.

As shown in FIG. 3, the battery module 1 includes a battery cell array structure 10, the upper cap 13, the lower cap 14, an acquisition board 15, and a fireproof member 17. The battery cell array structure 10 includes a plurality of battery cells 11 and a plurality of bus bars 12 electrically connecting the plurality of battery cells 11. The plurality of battery cells 11 are arranged in the horizontal direction (the length direction indicated by the arrow x or the width direction indicated by the arrow y).

The battery cell array structure 10 is disposed between the upper cap 13 and the lower cap 14. The acquisition board 15 is located at one side of the battery cell array structure 10 and is vertically disposed; the acquisition board 15 connects to the battery cells 11 in the battery cell array structure 10. The fireproof member 17 is disposed vertically, the plurality of battery cells 11 of the battery cell array structure 10 are each disposed with a vent 116, and all vents 116 of the battery cell array structure 10 face the fireproof member 17.

In the battery module 1, only one battery cell array structure 10 is disposed between the upper cap 13 and the lower cap 14.

Figure 4:
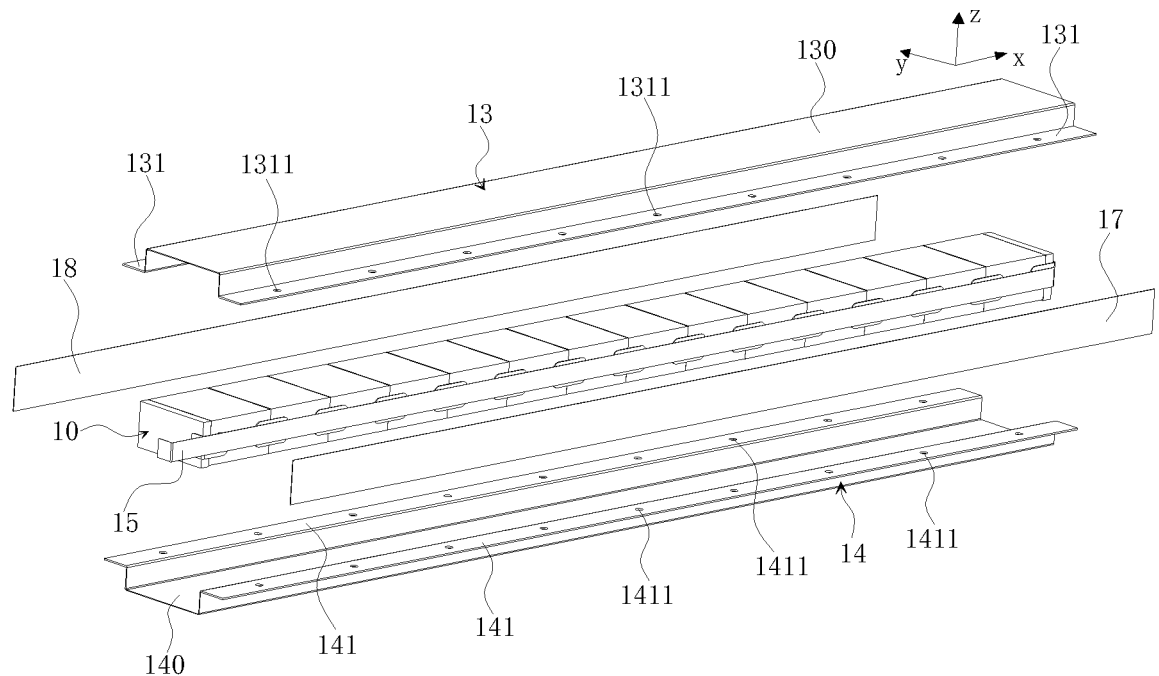
FIG. 4 shows another exploded view of a battery module with a single battery cell array structure.

As shown in FIG. 4, the battery module 1 may further includes a cooling member 18 extending in the direction in which the battery cells 11 are arranged and used to cool all of the battery cells 11 of the battery cell array structure 10. The cooling member 18 is vertically disposed and located at one side of the battery cell array structure 10.

Figure 5:
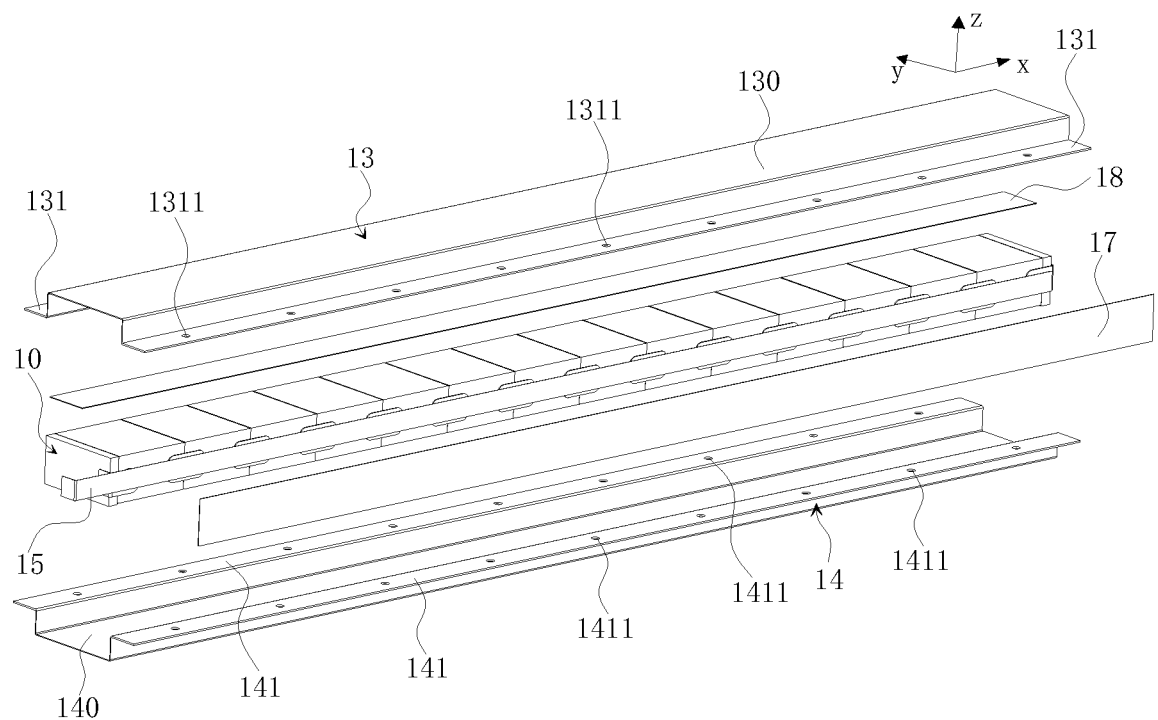
FIG. 5 shows another exploded view of a battery module with a single battery cell array structure.
Figure 6:
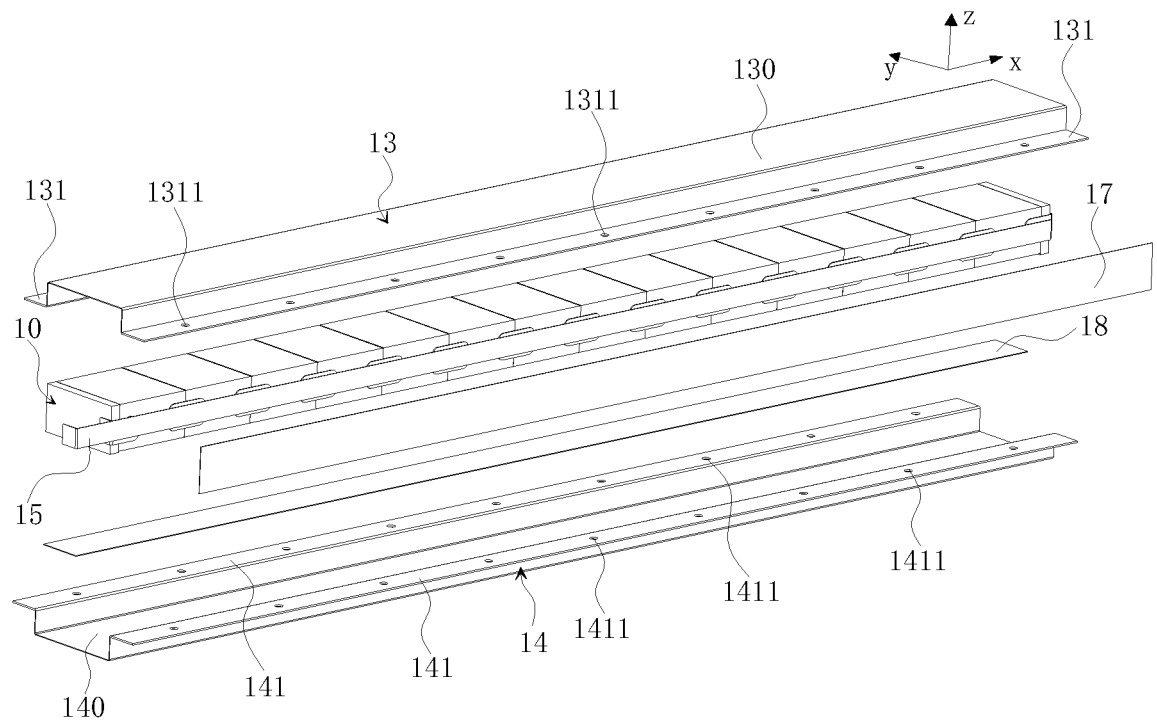
FIG. 6 shows another exploded view of a battery module with a single battery cell array structure.

As shown in FIG. 5 and FIG. 6, the cooling member 18 may be horizontally disposed, and the cooling member 18 may be disposed on an upper surface of the battery cell array structure 10 (as shown in FIG. 5) or on a lower surface of the battery cell array structure 10 (FIG. 6).

Figure 7:
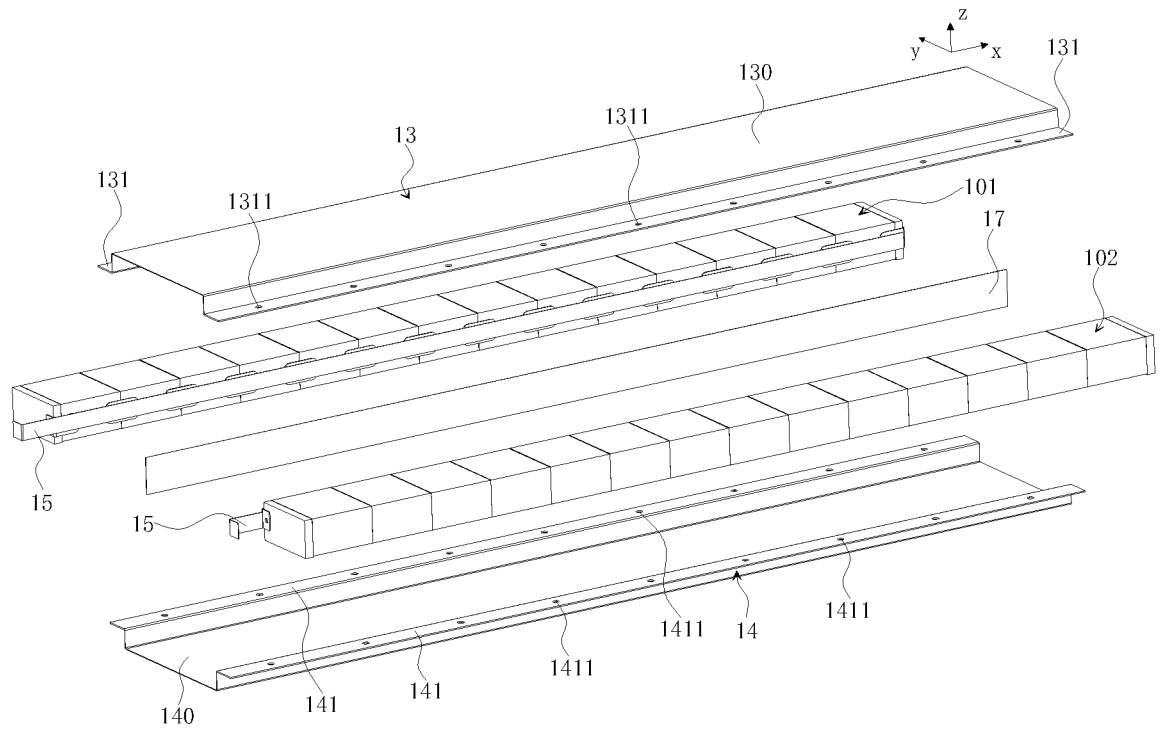
FIG. 7 shows an exploded view of a battery module with a single-layer multi-column battery cell array structure.

FIG. 7 shows a battery module with a single-layer multi-column battery cell array structure, the battery module 1 includes two (or more) battery cell array structures 10, one of which is a first battery cell array structure 101, and the other (another) battery cell array structure 10 adjacent to the first battery cell array structure 101 is a second battery cell array structure 102. The two (or more) battery cell array structures 10 are arranged in a single-layer multi-column manner.

All vents 116 of the first battery cell array structure 101 and all vents 116 of the second battery cell array structure 102 face the fireproof member 17 located between the vents 116 of the first battery cell array structure 101 and the vents 116 of the second battery cell array structure 102. In this way, the fireproof member 17 is disposed between the vents 116 of the first battery cell array structure 101 and the vents 116 of the second battery cell array structure 102. The fireproof member 17 separates battery cells 11 of the first battery cell array structure 101 from battery cells 11 of the second battery cell array structure 102, thereby preventing the battery cells 11 that have undergone thermal runaway from initiating thermal runaway to adjacent battery cells 11. The fireproof member 17 is made of a high-temperature-resistant material with a melting point of more than 900° C. In an example, the fireproof member 17 is a mica board. Similarly, when the battery module 1 includes more than two battery cell array structures 10 in the single-layer multi-column manner, all vents of the battery cell array structures face the fireproof member 17, thereby preventing the battery cells 11 that have undergone thermal runaway from initiating thermal runaway to other battery cells 11.

Figure 8:
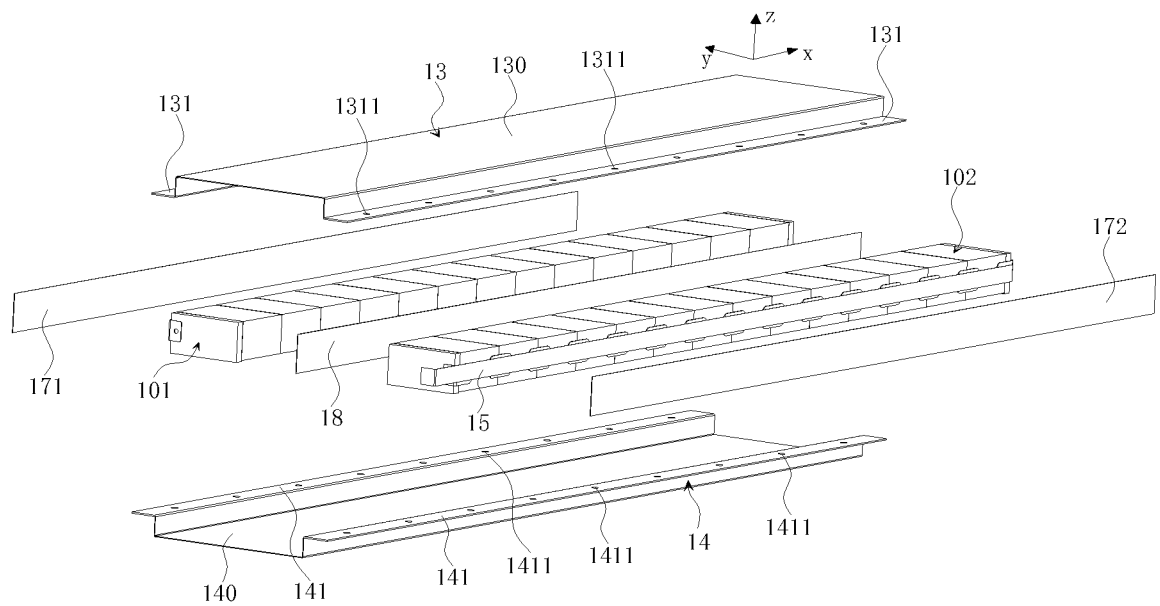
FIG. 8 shows another exploded view of a battery module with a single-layer multi-column battery cell array structure.

FIG. 8 shows another battery module with a single-layer multi-column battery cell array structure, the battery module 1 includes two (or more) battery cell array structures 10, one of which is a first battery cell array structure 101, and the other (another) battery cell array structure 10 adjacent to the first battery cell array structure 101 is a second battery cell array structure 102. The vents 116 of the first battery cell array structure 101 face away from the vents 116 of the second battery cell array structure 102.

The fireproof member 17 includes a first fireproof member 171 and a second fireproof member 172. All the vents 116 of the first battery cell array structure 101 face the first fireproof member 171, and all the vents 116 of the second battery cell array structure 102 face the second fireproof member 172. In this way, the vents 116 of the first battery cell array structure 101 face the same direction—the first fireproof member 171, while the vents 116 of the second battery cell array structure 102 face another direction—the second fireproof member 172 in the other direction. The battery cells 11 of the first battery cell array structure 101 do not interfere with the battery cells 11 of the second battery cell array structure 102 and vice versa. The fireproof member 17 is made of a high-temperature-resistant material with a melting point of higher than 900° C. In an example, the fire-proof member 17 is a mica board.

The battery module 1 further includes a cooling member 18 disposed between the first battery cell array structure 101 and the second battery cell array structure 102. The cooling member 18 is configured to cool the battery cells 11 of the first battery cell array structure 101 and the battery cells 11 of the second battery cell array structure 102. In this way, one cooling member 18 may be saved.

Further, when the battery module 1 includes more than two battery cell array structures 10 in the single-layer multi-column manner, all vents of the battery cell array structures face the fireproof member 17, thereby preventing the battery cells 11 that have undergone thermal runaway from initiating thermal runaway to other battery cells 11. The cooling member 18 is disposed between every two battery cell array structures, to cool the battery cells 11 of the battery cell array structures.

Figure 9:
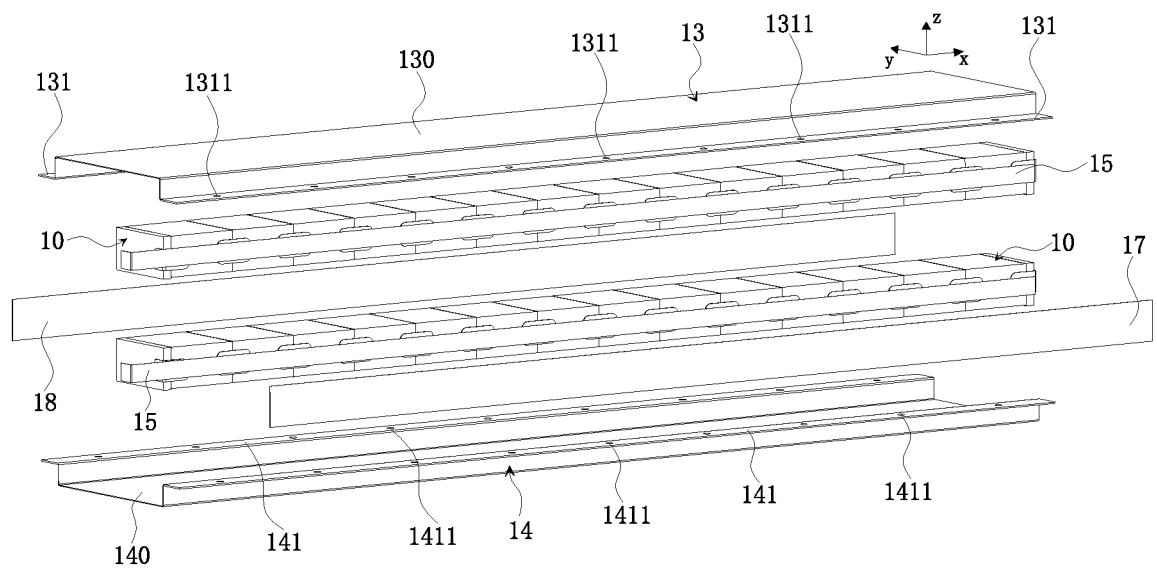
FIG. 9 shows another exploded view of a battery module with a multi-layer single-column battery cell array structure.

FIG. 9 shows a battery module with a multi-layer single-column battery cell array structure, the battery module 1 includes two or more battery cell array structures 10 arranged in the vertical direction (the direction indicated by the arrow z). The two or more battery cell array structures 10 in the vertical direction (the direction indicated by the arrow z) may share one fireproof member 17 and one cooling member 18 at the same time.

Figure 10:
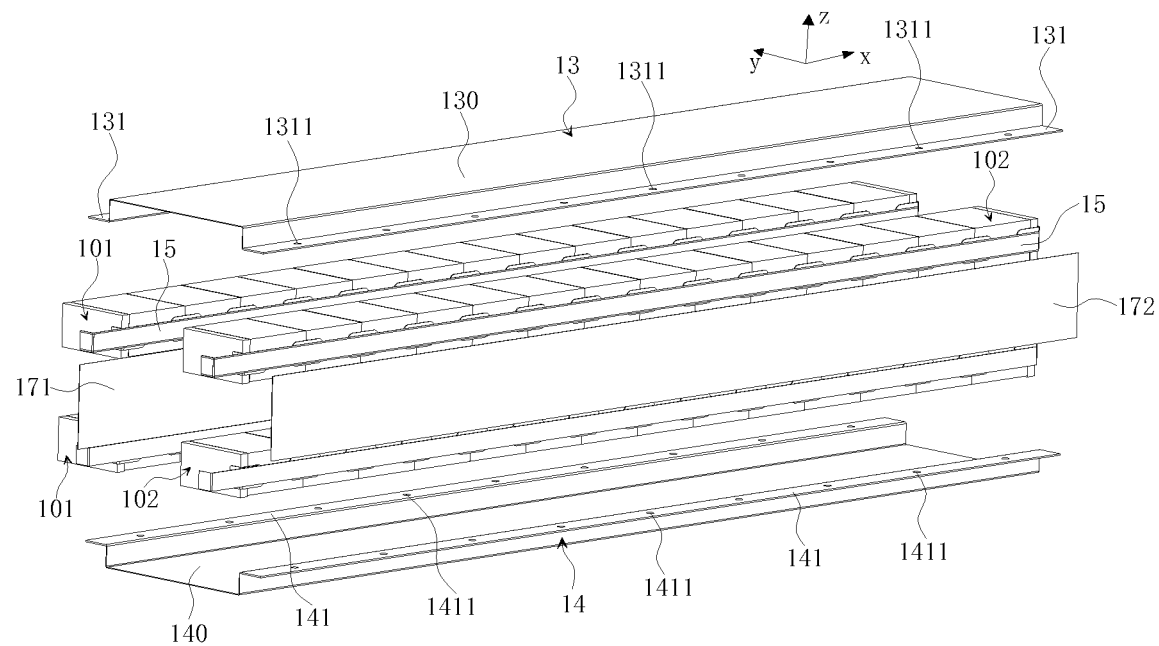
FIG. 10 shows an exploded view of a battery module with a multi-layer multi-column battery cell array structure.

FIG. 10 shows a battery module with a multi-layer multi-column battery cell array structure, the battery module 1 includes two (or more) battery cell array structures 10 arranged in the horizontal direction (the direction indicated by the arrow x, or the direction indicated by the arrow y), wherein one battery cell array structure 10 is the first battery cell array structure 101, and the other (another) battery cell array structure adjacent to the first battery cell array structure 101 is the second battery cell array structure 102. The battery module 1 further includes two or more first battery cell array structures 101 arranged in the vertical direction (the direction indicated by the arrow z), and two or more second battery cell array structures 102 arranged in the vertical direction (the direction indicated by the arrow z). The vents of the first battery cell array structures 101 and the vents of the second battery cell array structures 102 may orient the same direction.

The fireproof member 17 includes the first fireproof member 171 and the second fireproof member 172. Vents 116 of the two first battery cell array structures 101 in the vertical direction (the direction indicated by the arrow z) face the first fireproof member 171. Vents 116 of the two second battery cell array structures 102 in the vertical direction (the direction indicated by the arrow z) face the second fireproof member 172. The fireproof member 17 is made of a high-temperature-resistant material with a melting point of higher than 900° C. In an example, the fire-proof member 17 is a mica board.

Figure 11:
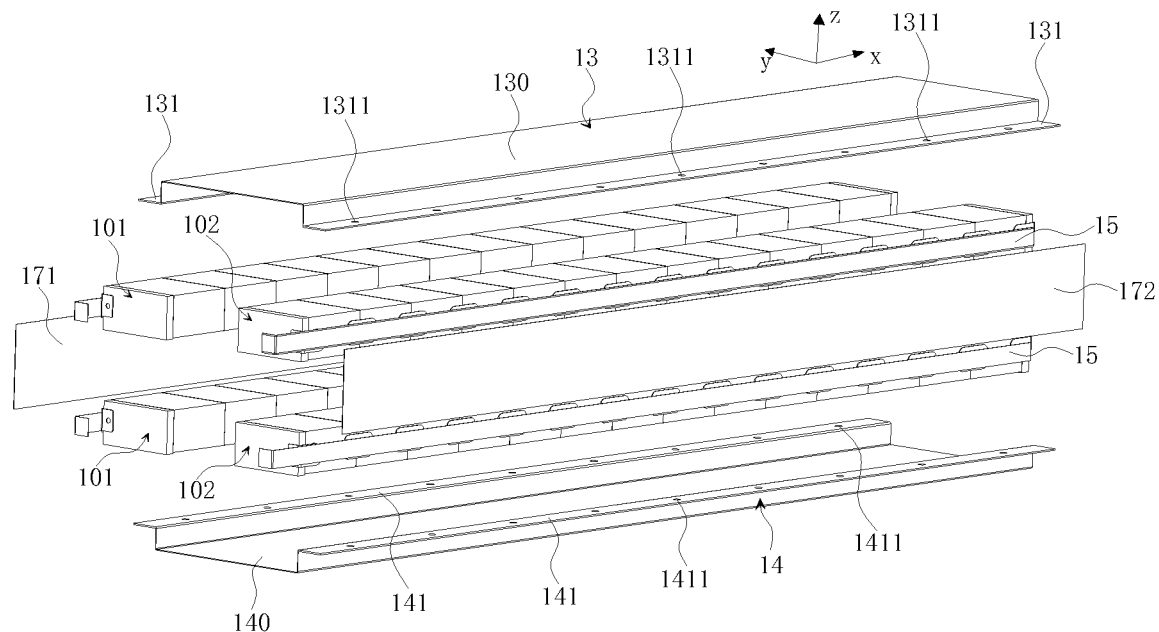
FIG. 11 shows another exploded view of a battery module with a multi-layer multi-column battery cell array structure.

FIG. 11 shows another battery module with a multi-layer multi-column battery cell array structure. The battery module 1 includes two (or more) battery cell array structures 10 arranged in the horizontal direction, i.e., the first battery cell array structure 101 and the second battery cell array structure 102 adjacent thereto. The battery module 1 further includes two or more first battery cell array structures 101 arranged in the vertical direction (the direction indicated by the arrow z), and two or more second battery cell array structures 102 arranged in the vertical direction (the direction indicated by the arrow z). The vents of the first battery cell array structures 101 may face away from the vents of the second battery cell array structures 102.

All the vents 116 of the two or more first battery cell array structures 101 arranged in the vertical direction (the direction indicated by the arrow z) face the first fireproof member 171, and all the vents 116 of the two or more first battery cell array structures 102 arranged in the vertical direction (the direction indicated by the arrow z) face the second fireproof member 172.

Figure 12:
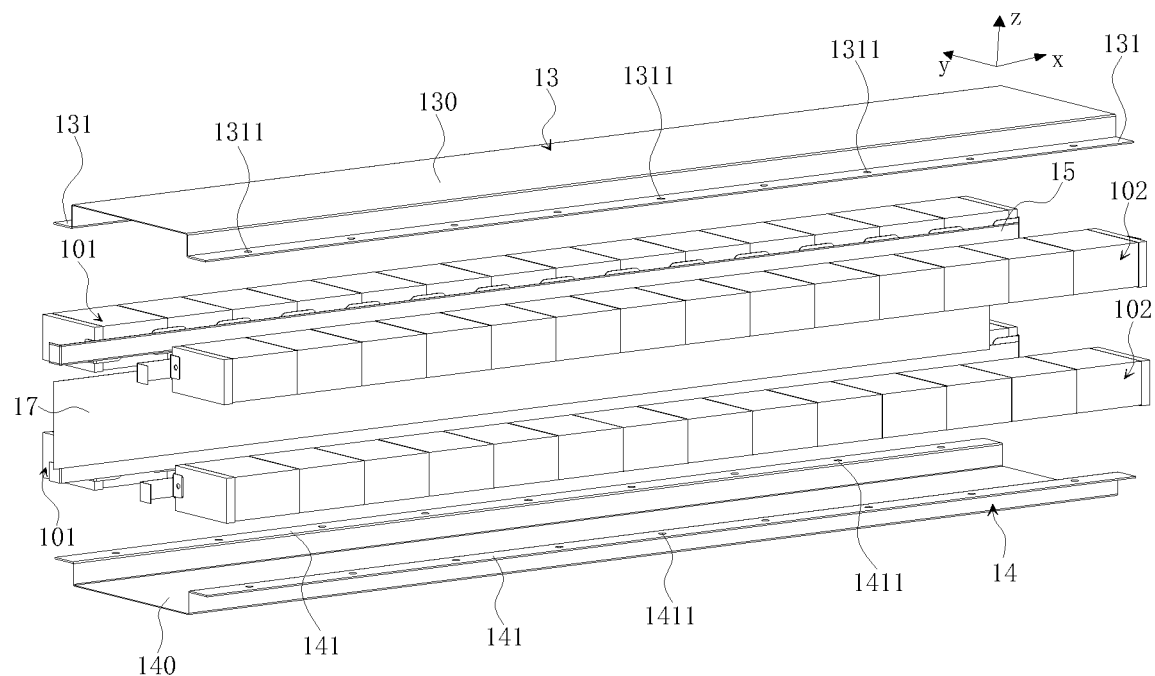
FIG. 12 shows another exploded view of a battery module with a multi-layer multi-column battery cell array structure.

FIG. 12 shows another battery module with a multi-layer multi-column battery cell array structure. The battery module 1 includes two (or more) battery cell array structures 10 arranged in the horizontal direction, i.e., the first battery cell array structure 101 and the second battery cell array structure 102 adjacent thereto. The battery module 1 includes two or more first battery cell array structures 101 arranged in the vertical direction (the direction indicated by the arrow z), and two or more second battery cell array structures 102 arranged in the vertical direction (the direction indicated by the arrow z). The vents of the first battery cell array structures 101 may face the vents of the second battery cell array structures 102. The first fireproof member 171 is disposed between the vents of the first battery cell array structures 101 and the vents of the second battery cell array structures 102.

In other embodiments, the battery module 1 includes two or more battery cell array structures 10 arranged in the vertical direction (the direction indicated by the arrow z). The battery cell array structure 10 in the vertical direction (the direction indicated by the arrow z) is not limited to two layers, but may have two or more layers, for example, three layers, four layers, and the like. The battery cell array structure 10 includes a plurality of battery cells 11 which are arranged in the horizontal direction (the length direction indicated by the arrow x or the width direction indicated by the arrow y). The plurality of battery cells 1 in the horizontal direction (the length direction indicated by the arrow x or the width direction indicated by the arrow y) may be arranged at intervals, may not necessarily be close to each other, but may be arranged at a certain distance with each other, which also falls into the protection scope of the present embodiment.

Figure 13:
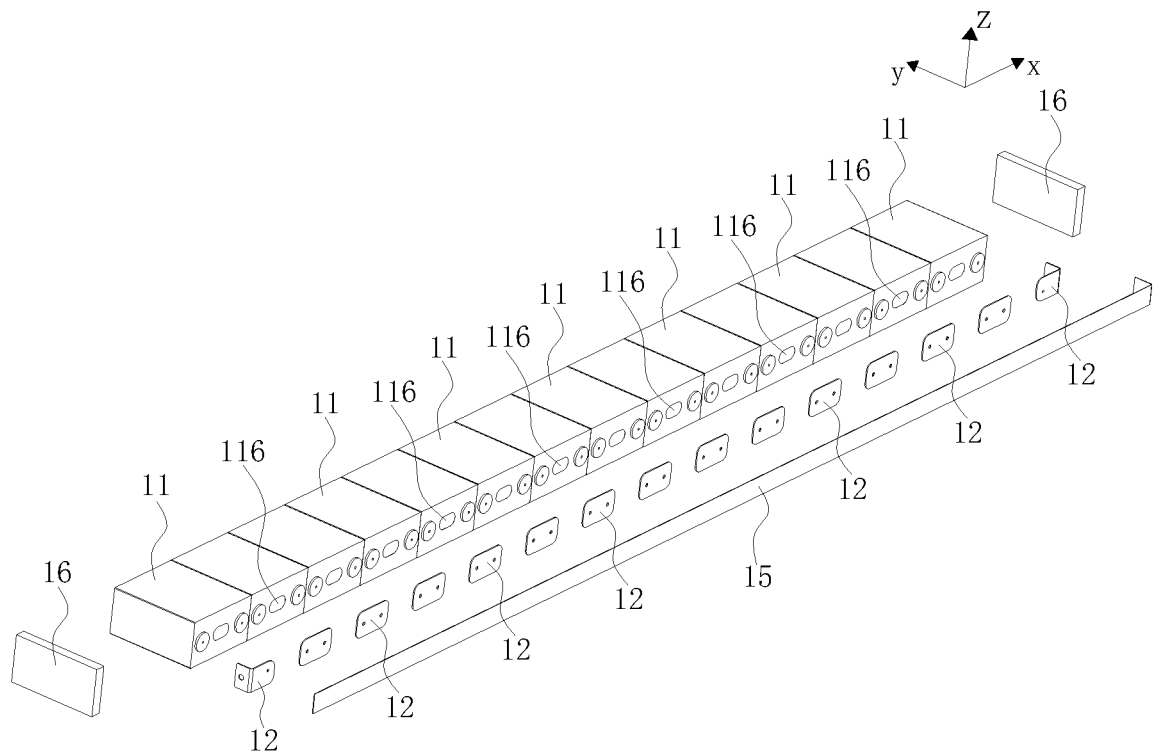
FIG. 13 shows an exploded view of a battery cell array structure.
Figure 14:
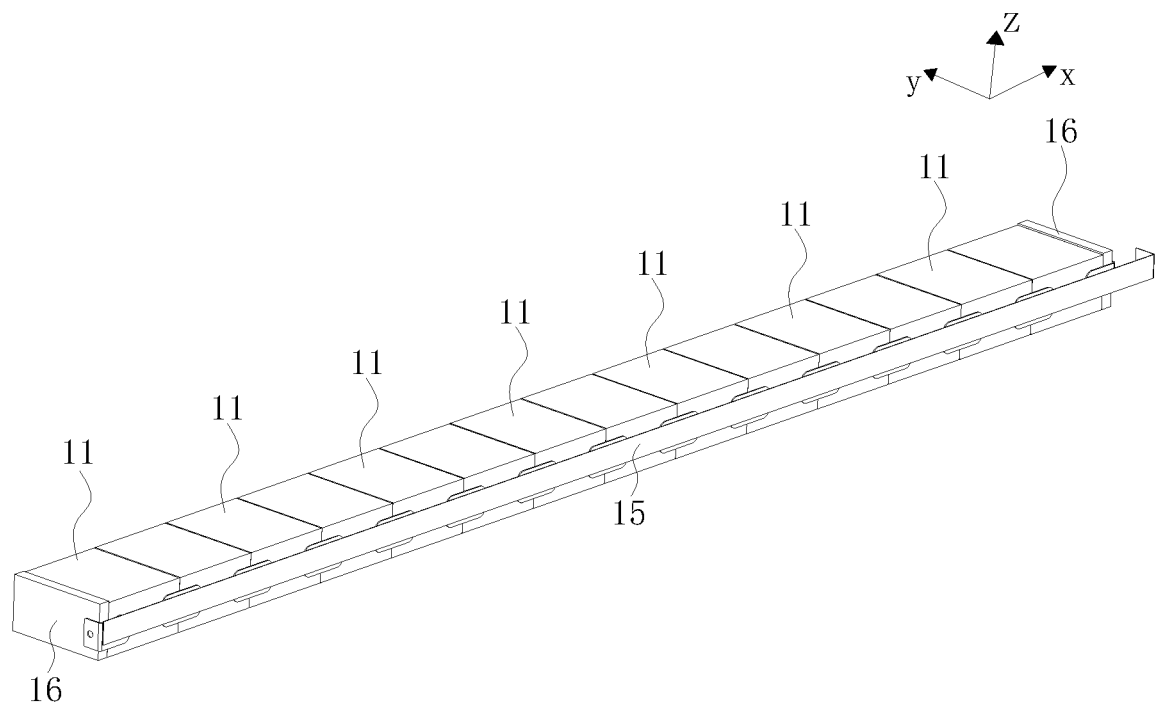
FIG. 14 shows a schematic structure of the battery cell array structure.

As shown in FIG. 13 and FIG. 14, the battery cell array structure 10 includes a plurality of battery cells 11 and a plurality of bus bars 12 electrically connecting the plurality of battery cells 11. The plurality of battery cells 11 are arranged in the horizontal direction (the length direction indicated by the arrow x or the width direction indicated by the arrow y). The acquisition board 15 is located at one side of the battery cell array structure 10 and is vertically disposed, the acquisition board 15 connects to the battery cells 11 in the battery cell array structure 10.

Additionally, the battery cell array structure 10 further includes two end plates 16 respectively located at both ends of the plurality of battery cells 11 as a whole in the horizontal direction (the length direction indicated by the arrow x or the width direction indicated by the arrow y).

In a specific embodiment, a side of a battery cell 11 is glued to adjacent battery cells 11, and the end plates 16 are disposed at both ends of the plurality of glued battery cells 11 as a whole to form a battery cell array structure 10. The battery cells 11 are electrically connected by bus bars 12, and the acquisition board 15 is disposed at the bus bars 12 of the battery cell array structure 10. The battery cell array structure 10 is laid flat on the lower cap 14. The battery cell array structure 10 is fixed to the lower cap 14 by structural adhesive. The upper surface of the battery cell array structure 10 is fixed to the upper cover 13 by structural adhesive. The first fixing portion 131 and the second fixing portion 141 respectively extend from both sides of the upper cap 13 and the lower cap 14.

Figure 15:
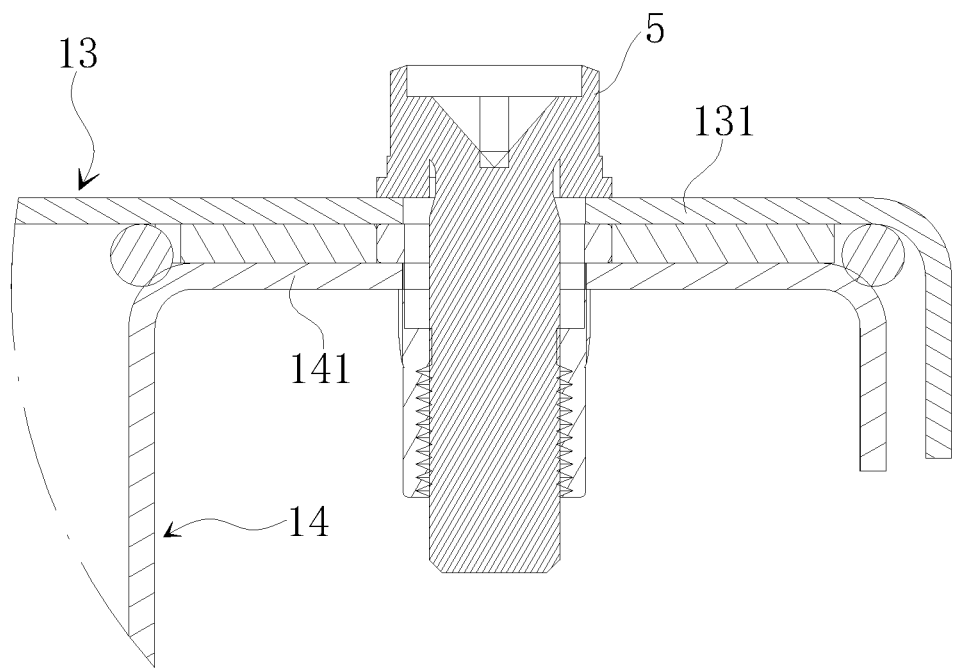
FIG. 15 shows a cross-sectional view of a first fixing portion and a second fixing portion.

As shown in FIG. 15, the first fixing portion 131 and the second fixing portion 141 are mutually fixed by adhesive. It shall be noted that a cross-section of the first fixing portion 131 and second fixing portion 141 is a U-shaped, V-shaped, L-shaped or Z-shaped figure, or a combination thereof.

Figure 16:
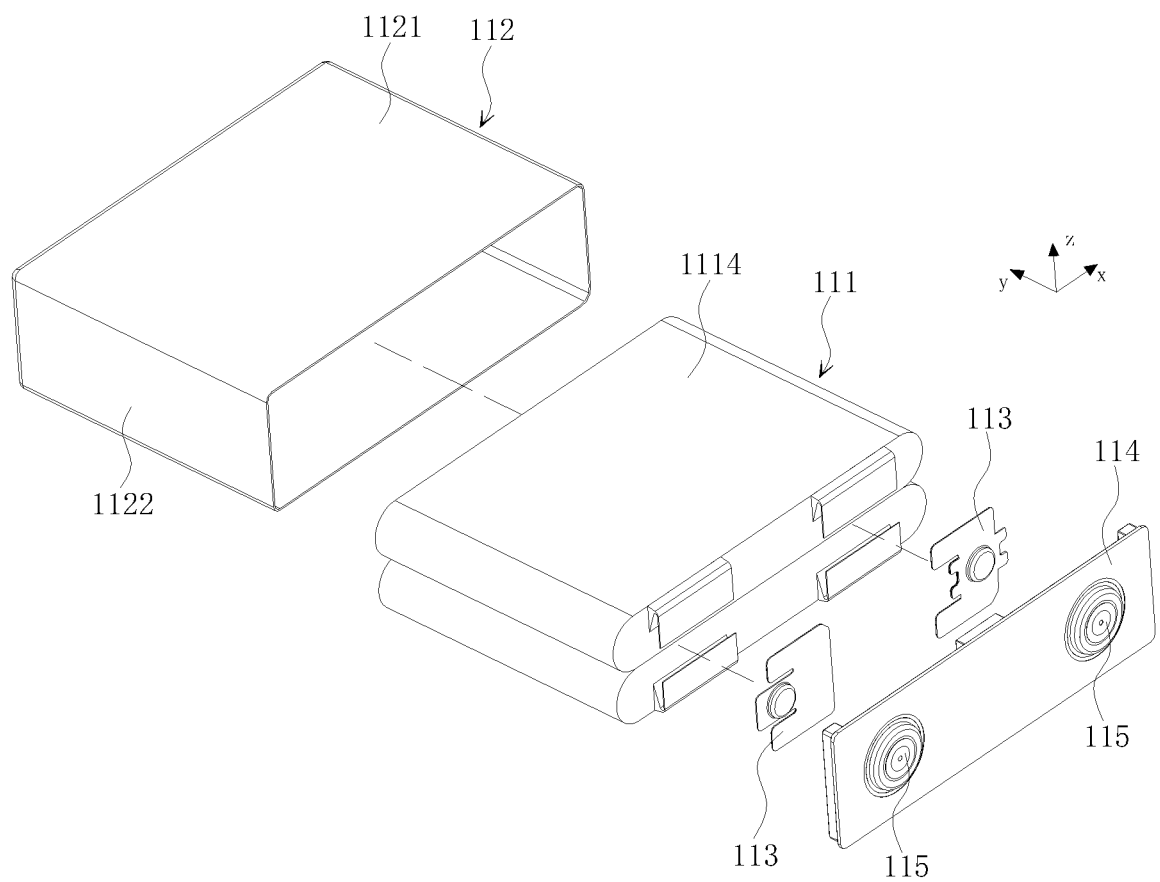
FIG. 16 shows an exploded view of a battery cell.

As shown in FIG. 16, a battery cell 11 includes an electrode assembly 111, a battery case 112, an electrode terminal connector 113 and a cap plate 114. The battery case 112 may be hexahedron-shaped or otherwise. The battery case 112 has an inner space accommodating the electrode assembly 111 and electrolyte, and the battery case 112 has an opening. The electrode assembly 111 is accommodated in the battery case 112. The cap plate 114 covers the opening and is used to encapsulate the electrode assembly 111 in the battery case 112. The electrode assembly 111 and the electrode terminal 115 are electrically connected by the electrode terminal connector 113. In this embodiment, there are two electrode terminal connectors 113, i.e., a positive electrode terminal connector 113 and a negative electrode terminal connector 113. The battery case 112 may be made of Aluminum, Aluminum alloy or plastics or the like.

The electrode assembly 111 is accommodated in the battery case 112. The electrode assembly 111 includes a first electrode plate 1111, a second electrode plate 1112, and a separator 1113 arranged between the first electrode plate 1111 and the second electrode plate 1112. The first electrode plate 1111 may be a positive electrode plate or a negative electrode plate, and the second electrode plate 1112 is opposite in polarity against the first electrode plate 1111, and correspondingly, the second electrode plate 1112 is a negative electrode plate or a positive electrode plate. The separator 1113 is an insulator between the first electrode plate 1111 and the second electrode plate 1112. The electrode assembly 111 may be a wound structure (as shown in FIG. 17) or a laminated structure (as shown in FIG. 18).

Illustratively, the first electrode plate 1111 being a positive electrode plate and the second electrode plate 1112 being a negative electrode plate are taken as examples for description. Similarly, in other embodiments, the first electrode plate 1111 may be a negative electrode plate, and the second electrode plate 1112 may be a positive electrode plate. Further, a positive electrode active material is applied onto a coated region of the positive electrode plate, and a negative electrode active material is applied onto a coated region of the negative electrode plate. The uncoated region extending from the coated zone acts as a tab. The electrode assembly 111 includes two tabs, i.e., a positive tab and a negative tab, wherein the positive tab extends from the coated region of the positive electrode plate and the negative tab extends from the coated region of the negative electrode plate. The positive tab and the positive electrode terminal are electrically connected through the positive electrode terminal connector 113, and the negative tab and the negative electrode terminal are electrically connected through the negative electrode terminal connector 113.

The battery case 112 is approximately a hexahedral structure and includes two first surfaces 1121 and two second surfaces 1122, the area of the first surfaces 1121 being larger than the area of the second surfaces 1122. In each battery cell 11 of the battery module 1, the two second surfaces 1122 of the battery case 112 are opposite to each other in the horizontal direction (for example, the length direction indicated by the arrow x), and the two first surfaces 1121 of the case 112 are opposite to each other in the vertical direction (for example, the direction indicated by the arrow z).

Figure 17:
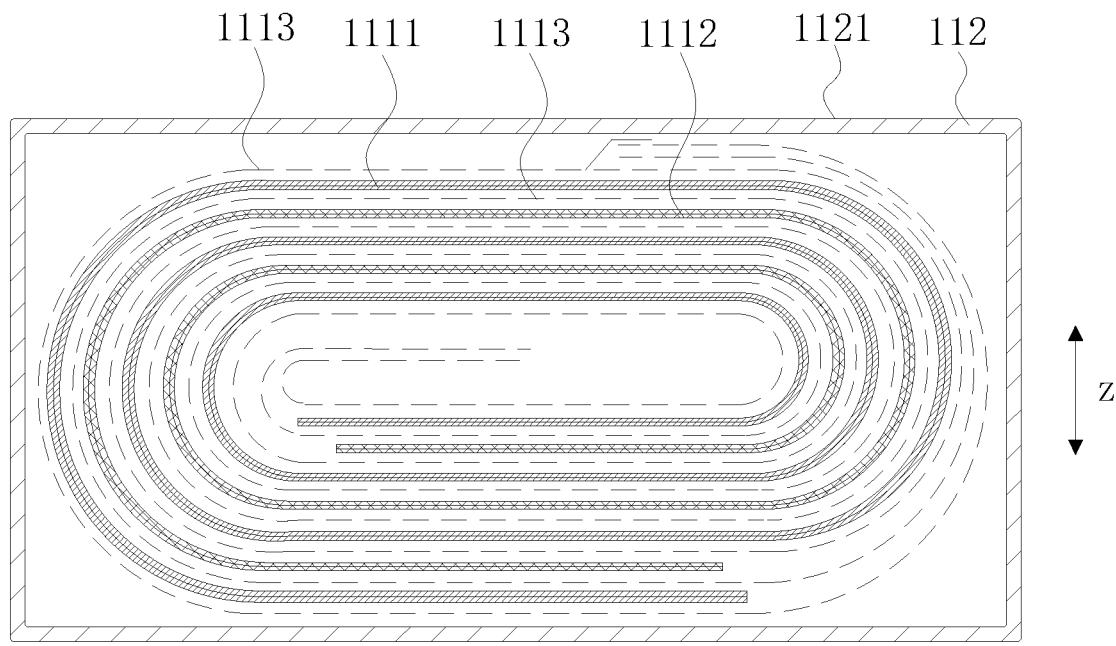
FIG. 17 shows a cross-sectional view of an electrode assembly being of a wound structure.
Figure 18:
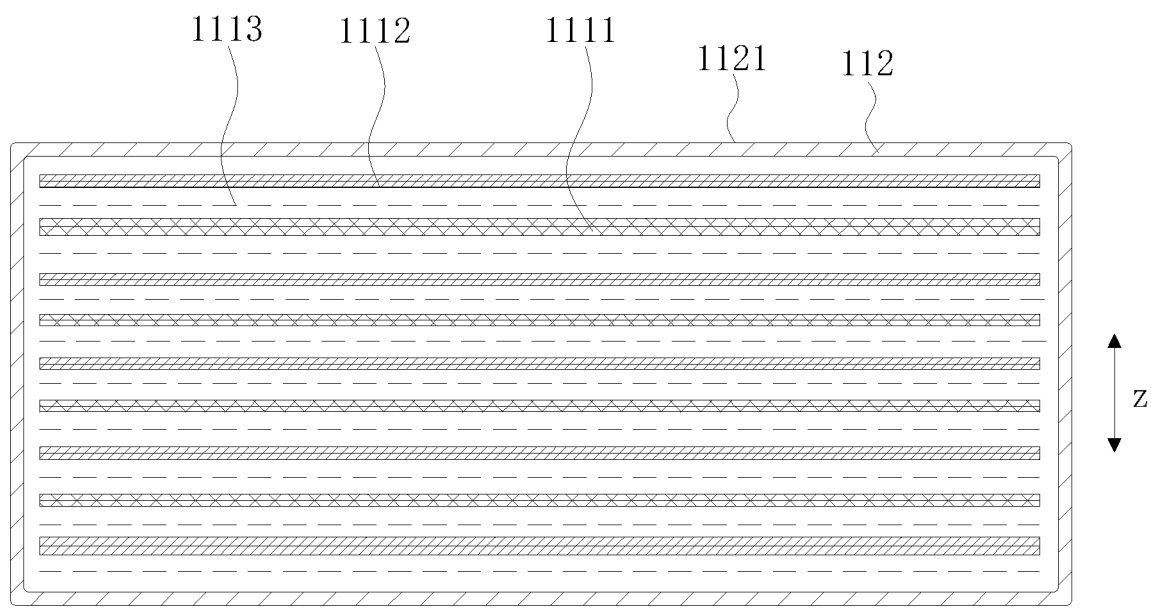
FIG. 18 shows a cross-sectional view of an electrode assembly being of a laminated structure.

As shown in FIG. 16 and FIG. 17, when the electrode assembly 111 is a wound structure, the electrode assembly 111 is flat, and the outer surface of the electrode assembly 111 includes two flat surfaces 1114 that are opposite to each other in the vertical direction (the direction indicated by the arrow z), i.e., the flat two surfaces 1114 are opposite to the first surfaces 1121. The electrode assembly 111 is approximately a hexahedral structure. The flat surfaces 1114 are generally parallel to the winding axis and are the largest outer surface. The flat surfaces 1114 may be relatively flat but are not required to be absolutely flat.

As shown in FIG. 18, when the electrode assembly 111 is a laminated structure, the first electrode plate 1111, the separator 1113 and the second electrode plate 1112 are laminated in the vertical direction (the direction indicated by the arrow z), that is, the surface of the first electrode plate 1111 and the first surfaces 1121 are opposite to each other.

The electrode assembly 111 may swell in the thickness direction of the first electrode plate 1111 during charging and discharging. In the electrode assembly 111 of the wound structure, a swelling force is greatest in a direction perpendicular to the flat surfaces 1114; in the electrode assembly 111 of the laminated structure, the swelling force is greatest in a laminating direction of the first electrode plate 1111 and second electrode plate 1112.

In an embodiment of the present disclosure, the electrode assembly 111 may be a wound structure or a laminated structure. When the electrode assembly 111 is a wound structure, the flat surfaces 1114 orients the vertical direction (the direction indicated by the arrow z). When the electrode assembly 111 is a laminated structure; the first electrode plate 1111 and the second electrode plate 1112 are laminated in the vertical direction (the direction indicated by the arrow z). It is seen that the electrode assembly 111, whether being a wound structure or a laminated structure, applies the greatest swelling force to the battery case 112 in the vertical direction.

However, in the existing technology, in a battery cell 11 of the battery module 1, the greatest swelling force of the electrode assembly 111 on the case 112 is always in the horizontal direction. Since the dimension of the battery module 1 in the horizontal direction is much larger than the dimension in the vertical direction (for example, limited by a height of a car's chassis, more battery cells 11 are needed to be arranged in the horizontal direction, and the swelling force is accumulated), the existing battery module 1 bears an extremely great swelling force in the horizontal direction. Therefore, it is necessary to arrange two particularly thick end plates on both sides of the battery module 1 in the horizontal direction so as to resist the swelling force. However, an increased thickness to the end plates may decrease energy density of the battery module 1. In the embodiment of the present disclosure, the electrode assembly 111 applies the greatest swelling force to the case 112 in the vertical direction. Due to that there are fewer battery cells 11 laminated in the vertical direction, the greatest swelling force of the battery module 1 can be significantly decreased, as compared with the existing technologies.

In addition, the battery cells 11 may generate gas inside the battery case 112 during charging and discharging, thus the generated gas may apply a force onto the battery case 112, thereby aggravating outward swelling of the battery case 112. In the present disclosure, since the area of the first surfaces 1121 is larger than the area of the second surfaces 1122, and the two first surfaces 1121 of the battery case 112 are opposite to each other in the vertical direction, the generated gas has the maximum force applied onto the battery case 112 in the vertical direction, which further decreases the greatest swelling force of the battery module 1, as compared with the existing technologies.

It shall be noted that although the above embodiments have been described herein, the protection scope of the present disclosure is not limited hereby. Therefore, based on the innovative concept of the present disclosure, changes and modifications performed on the embodiments herein, changes to equivalent structures and processes in accordance with the specification of the specification and the drawings, and direct and indirect application of the above-described technical solutions in other related technical fields are all included in the protection scope of the present disclosure.

What is claimed is:

1. A battery module, comprising:
    a battery cell array structure, comprising a plurality of battery cells and a plurality of bus bars electrically connecting the plurality of battery cells respectively, the plurality of battery cells being arranged in a horizontal direction; the plurality of battery cells are each disposed with a vent;
    an upper cap;
    a lower cap; wherein the upper cap and the lower cap form a casing, said casing having two openings on opposing ends; and
    a fireproof member; wherein the fireproof member is a fireproof plate extending in a direction in which the plurality of battery bells are arranged in the battery cell array structure and disposed vertically at a side of the battery cell array structure; all vents of the battery cell array structure are disposed facing and directly opposite to the fireproof plate;
    wherein the battery cell array structure is disposed between the upper cap and the lower cap;
    wherein each battery cell comprises an electrode assembly and a battery case, the electrode assembly is housed in the battery case, and the electrode assembly comprises a first electrode plate, a second electrode plate, and a separator disposed between the first electrode plate and the second electrode plate; and wherein the electrode assembly is configured to be at least one of: (i) a wound structure, outer surface of the electrode assembly comprising two flat surfaces opposite to each other in a vertical direction, the two flat surfaces being the largest outer surfaces; (ii) a laminated structure, the first electrode plate, the separator and the second electrode plate are laminated in the vertical direction;

wherein, the upper cap comprises:
  a first main board, and
  two first fixing portions respectively connecting to opposing sides of the first main board and extending away from the first main board in the horizontal direction;

the lower cap comprises:
  a second main board, and
  two second fixing portions respectively connecting to opposing sides of the second main board and extending away from the second main board in the horizontal direction;

wherein the first main board and the second main board are configured to form the casing with two openings on opposing ends, and the casing is configured for accommodating the battery cell array structure;

the two first fixing portions are disposed opposite to and directly attached to the two second fixing portions respectively, the two first fixing portions and the two second fixing portions are fixedly connected and extend in the horizontal direction away from the casing for being fixed to a housing body of a battery pack.

2. The battery module according to claim 1, wherein the battery module further comprises an acquisition board located at one side of the battery cell array structure and disposed vertically, the acquisition board connects to the battery cells of the battery cell array structure.

3. The battery module according to claim 1, wherein the battery module comprises two or more battery cell array structures, one of which is a first battery cell array structure, and the other/another battery cell array structure adjacent to the first battery cell array structure is a second battery cell array structure; and vents of the first battery cell array structure face vents of the second battery cell array structure, a fireproof member is located between the vents of the first battery cell array structure and the vents of the second battery cell array structure.

4. The battery module according to claim 1, wherein the battery module comprises two or more battery cell array structures, one of which is a first battery cell array structure, and the other/another battery cell array structure adjacent to the first battery cell array structure is a second battery cell array structure;

the vents of the first battery cell array structure face away from the vents of the second battery cell array structure; and the fireproof member comprises a first fireproof member and a second fireproof member, the vents of the first battery cell array structure face the first fireproof member, and the vents of the second battery cell array structure face the second fireproof member.

5. The battery module according to claim 1, wherein the battery module comprises two or more battery cell array structures, one of which is a first battery cell array structure, and the other/another battery cell array structure adjacent to the first battery cell array structure is a second battery cell array structure; and the battery module further comprises a cooling member disposed between the first battery cell array structure and the second battery cell array structure, the cooling member is configured to cool the battery cells of the first battery cell array structure and the battery cells of the second battery cell array structure.

6. The battery module according to claim 1, wherein the battery module comprises two or more said battery cell array structures arranged in the vertical direction, and/or
  the battery module comprises two or more said battery cell array structures arranged in the horizontal direction.

7. The battery module according to claim 3, wherein the battery module comprises two or more said battery cell array structures arranged in the vertical direction, and/or
  the battery module comprises two or more said battery cell array structures arranged in the horizontal direction.

8. The battery module according to claim 4, wherein the battery module comprises two or more said battery cell array structures arranged in the vertical direction, and/or
  the battery module comprises two or more said battery cell array structures arranged in the horizontal direction.

9. The battery module according to claim 5, wherein the battery module comprises two or more said battery cell array structures arranged in the vertical direction, and/or
  the battery module comprises two or more said battery cell array structures arranged in the horizontal direction.

10. A battery pack, comprising:
  a housing, and
  a plurality of battery modules being disposed in the housing;
  wherein each battery module comprises:
  a battery cell array structure, comprising a plurality of battery cells and a plurality of bus bars electrically connecting the plurality of battery cells respectively, the plurality of battery cells are arranged in a horizontal direction; the plurality of battery cells are each disposed with a vent;
  an upper cap;
  a lower cap; wherein the upper cap and the lower cap form a casing, said casing having two openings on opposing ends; and
  a fireproof member; wherein the fireproof member is a fireproof plate extending in a direction in which the plurality of battery cells are arranged in the battery cell array structure and disposed vertically at a side of the battery cell array structure; all vents of the battery cell array structure are disposed facing and directly opposite to the fireproof plate;
  wherein the battery cell array structure is disposed between the upper cap and the lower cap;
  wherein each battery cell comprises an electrode assembly and a battery case, the electrode assembly is housed in the battery case, and the electrode assembly comprises a first electrode plate, a second electrode plate, and a separator disposed between the first electrode plate and the second electrode plate; and
  wherein the electrode assembly is configured to be at least one of: (i) a wound structure, outer surface of the electrode assembly comprising two flat surfaces opposite to each other in a vertical direction, the two flat surfaces being the largest outer surfaces; (ii) a laminated structure, the first electrode plate, the separator and the second electrode plate are laminated in the vertical direction;

wherein, the upper cap comprises:
a first main board, and
two first fixing portions respectively connecting to opposing sides of the first main board and extending away from the first main board in the horizontal direction;

the lower cap comprises:
a second main board, and
two second fixing portions respectively connecting to opposing sides of the second main board and extending away from the second main board in the horizontal direction;

wherein the first main board and the second main board are configured to form the casing with two openings on opposing ends, and the casing is configured for accommodating the battery cell array structure;

the two first fixing portions are disposed opposite to and directly attached to the two second fixing portions respectively, the two first fixing portions and the two second fixing portions are fixedly connected and extend in the horizontal direction away from the casing for being fixed to a housing body of the battery pack.

11. The battery pack according to claim 10, wherein,
the housing comprises:
a housing cap, and
the housing body which is disposed with a fixing rod protruding from a surface of the housing body;
wherein the two first fixing portions, the two second fixing portions and the fixing rod are disposed sequentially; the two first fixing portions and the two second fixing portions extend away from the semi-enclosed cavity, and are fixed to the fixing rod.

12. The battery pack according to claim 11, wherein the first fixing portion is disposed with a first fixing bore, the second fixing portion is disposed with a second fixing bore, and the battery pack further comprises a bolt which passes through the first fixing bore and the second fixing bore and connects to the fixing rod to fix the battery module to the housing body.

13. The battery pack according to claim 11, further comprising a bead, wherein the first fixing portion and the second fixing portion are pressed between the bead and the fixing rod, such that the battery module is fixed to the housing body.

* * * * *